United States Patent [19]

Motoyama et al.

[11] Patent Number: 4,592,302
[45] Date of Patent: Jun. 3, 1986

[54] COATING METHOD AND APPARATUS

[75] Inventors: Shimesu Motoyama, Asaka; Shizuka Sakashita, Chiba; Nagayoshi Myo, Mitaka; Hirotsune Yasumi, Funabashi; Hiroaki Ogishima, Tokorozawa, all of Japan

[73] Assignee: Freund Industrial Co., Ltd., Tokyo, Japan

[21] Appl. No.: 669,264

[22] Filed: Nov. 7, 1984

[51] Int. Cl.⁴ ............................................. B05B 7/00
[52] U.S. Cl. ................................. 118/303; 427/212; 427/220; 427/221; 241/5; 241/39
[58] Field of Search ............... 427/213, 220, 221, 212; 118/303; 241/5, 39

[56] References Cited

U.S. PATENT DOCUMENTS

| 2,704,635 | 3/1955 | Trost | 241/5 |
| 2,821,346 | 1/1958 | Fisher | 241/39 |
| 3,003,751 | 10/1961 | Trost | 118/303 |
| 3,158,332 | 11/1964 | Wilson | 241/5 |
| 3,186,648 | 6/1965 | Mandle et al. | 241/5 X |
| 3,491,953 | 1/1970 | Stephanoff | 241/39 |
| 4,511,603 | 4/1985 | Wallace | 118/303 |

FOREIGN PATENT DOCUMENTS 990303 2/1983 U.S.S.R. .................. 241/5

Primary Examiner—Shrive P. Beck
Attorney, Agent, or Firm—Kane, Dalsimer, Kane, Sullivan and Kurucz

[57] ABSTRACT

Coating method and apparatus, in which jet streams of a high-pressure fluid are ejected in the opposed directions into a pulverization zone in a pulverizer to hit a raw material conveyed by one of the jet streams on the other and thereby pulverize the same, the surfaces of particles of the resultant raw material are coated at the same time that the pulverization is done. The raw material to be pulverized is fed into the pulverization zone with a jet stream or by a mechanical means to be then accelerated by a jet stream therein. A coating material is fed in the same direction in which a jet stream flows, or directly into the pulverization zone.

6 Claims, 8 Drawing Figures

COATING METHOD AND APPARATUS

BACKGROUND OF THE INVENTION

1. Field of the Invention

This invention relates to coating method and apparatus, and more particularly to a coating method and apparatus which are capable of pulverization-coating a fine material, such as the particles of fine powder.

2. Description of the Prior Art

In order to coat, for example, chemicals or food, a pan coating method, a fluidized bed coating method and a tumbling coating method are generally used.

However, the raw materials used in such coating systems are tablets, granules and pills, i.e. considerably large granular materials.

On the other hand, it has recently been demanded that, for example, chemicals having low solubility be pulverized in order to improve the solubility thereof.

However, there is a limit in the pulverization of such chemicals. Accordingly, the improvement of a dissolving rate of the pulverized chemicals is also limited. Under the circumstances, it is demanded that a dissolving rate of such pulverized chemicals be further improved.

The surfaces of particles of a certain kind of fine powder require to be modified, or contrary to the above-mentioned case, the particles of a certain kind of fine powder require to be coated with a material for reducing the solubility thereof.

Also, there are cases where the particles of, for example, the hydrophobic paint and pigment or the particles of fine wettable powder for agricultural chemicals require to be coated with a dispersing agent; and the particles of a copying toner and an active carbon require to be coated with a resin or wax.

When the particles of these fine materials are coated by the pan coating method, fluidized bed coating method and tumbling coating method, which are referred to previously, the granulation of the particles progresses simultaneously with the coating thereof. Therefore, it is very difficult to coat such fine particles while keeping the size thereof unchanged.

The techniques which enable the fine materials to be coated effectively for the above-mentioned purposes have not yet been proposed.

SUMMARY OF THE INVENTION

An object of the present invention is to provide coating method and apparatus which are capable of pulverization-coating fine materials easily.

Another object of the present invention is to provide coating method and apparatus which are capable of pulverization-coating fine materials uniformly.

Still another object of the present invention is to provide coating method and apparatus which are capable of coating fine materials while pulverizing the same.

In order to achieve the above objects, the present invention provides a coating method in which the materials to be coated are coated with a coating material, which is fed into a pulverizer using a fluid jet or an air stream as the materials to be coated are pulverized. The coating material is fed in the direction which is opposite to or identical with the direction in which the materials to be coated are fed, and the coated materials are then classified to recover the coated materials of a desired particle diameter only. The remaining coated materials may be returned to a coating section to process the same in a circulating manner.

The coating apparatus according to the present invention is provided with a coating material feed means in a pulverizer. The pulverizer may have a classification zone in the interior or exterior thereof. It may also be provided with a plurality of coating material feed means.

BRIEF DESCRIPTION OF THE DRAWINGS:

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENTS

Figure 1:
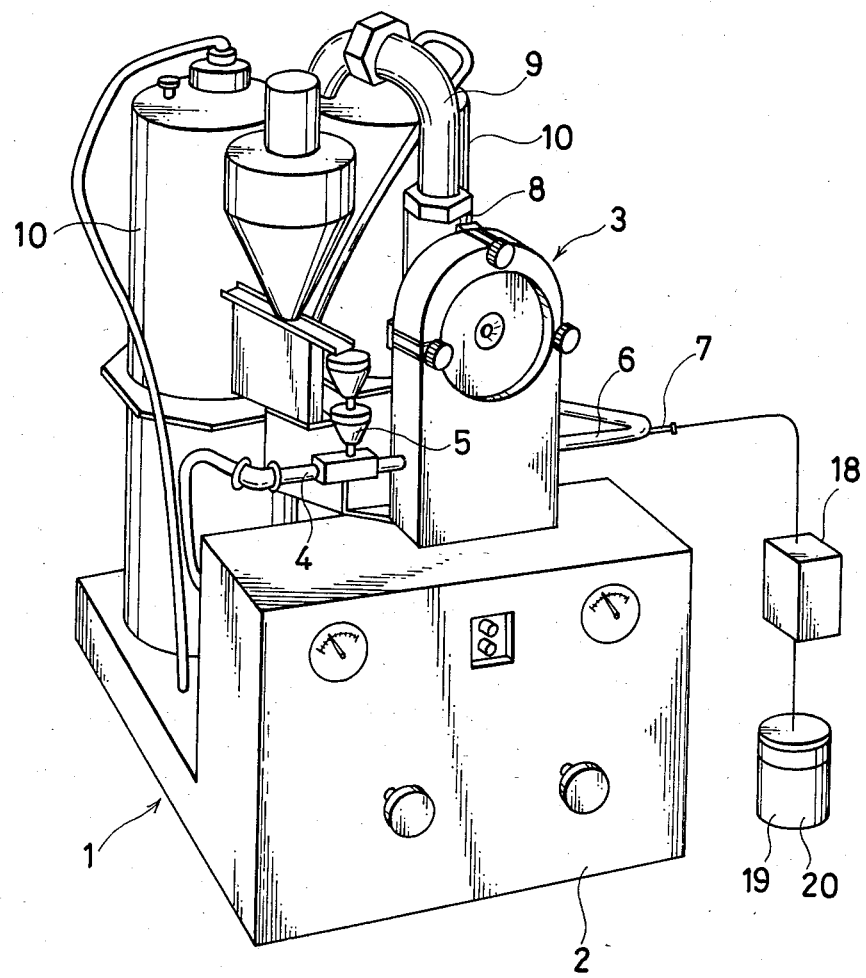
FIG. 1 is a general perspective view of a first embodiment of the coating apparatus according to the present invention.
Figure 2:
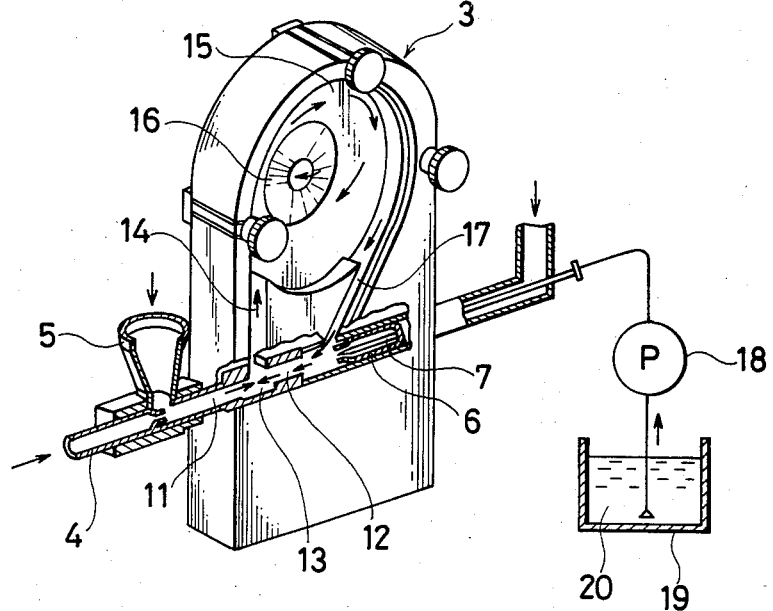
FIG. 2 is a partially sectioned perspective view of a coating mechanism in the embodiment.
Figure 3:
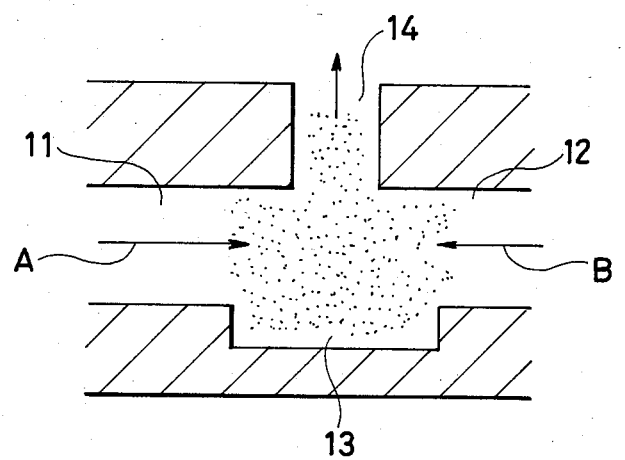
FIG. 3 is an enlarged fragmentary section of a pulverization-coating section of the coating mechanism.

Referring now to the drawings, FIG. 1 is a general perspective view of a first embodiment of the coating apparatus according to the present invention, FIG. 2 is a perspective view of a coating mechanism in the embodiment, and FIG. 3 is an enlarged partial section of a pulverization-coating section of the coating mechanism.

In the first embodiment, the coating apparatus is provided with a frame 1 having a control panel 2 with various meters and their operating knobs on the front surface thereof.

A coating mechanism 3 for coating the particles of a fine material, such as a powdered material with an active agent, a pigment and wax is set vertically on the upper surface of the central portion of the front section of frame 1. As will be described in detail later, this coating mechanism 3 is adapted to carry out the pulverization and coating operations of the particles of a powdered material, which is fed with a jet stream generated by an adiabatic expansion of a high-pressure fluid, such as the high-pressure air, by hitting these particles against the particles of a coating material which is fed in the direction, which is opposite to the direction in which the particles of the material to be coated is fed, with a jet stream generated by an adiabatic expansion of high-pressure fluid.

In order to carry out the pulverization and coating of the particles of a powdered material in this manner, an air feed nozzle 4 for supplying the high-pressure air from a high-pressure air supply source (not shown) is connected to one side portion (the left side portion in FIGS. 1–3) of the coating mechanism 3. A hopper 5 for feeding fine powder, an example of a raw powdered material to be coated, into the air feed nozzle 4 is joined to an intermediate portion thereof.

On the other hand, an air feed nozzle 6 for supplying the high-pressure air, which is used to convey and accelerate a solution of a coating material, for example, a pigment, an active agent and wax is connected to the other side portion (the right side portion in FIGS. 1-3) of the coating mechanism 3 in such a manner that this air feed nozzle 6 is opposed to and aligned with the abovementioned air feed nozzle 4. In the interior of the air feed nozzle 6, a nozzle 7 for feeding a solution of the coating material referred to above is inserted coaxially. Thus, the nozzles 6, 7 constitute two-fluid nozzles of a special construction, which are used to supply a gas and a liquid therethrough, respectively. A coating material 20 is fed under pressure from a tank 19 to the nozzle 7 by a pump 18.

A cyclone 8 for recovering the fine powder the particles of which have finished being coated in the coating mechanism 3 is provided on the rear side thereof. A bag filter 10 for collecting the fine powder contained in the air discharged from the cyclone 8 through a pipe 9 is provided at the back of the cyclone 8.

The coating mechanism 3 will now be described. The coating mechanism 3 has a pulverization chamber, i.e. a coating chamber 13 between an injector section 11 provided on the downstream side of the tip end of the air feed nozzle 4 and an injector section 12 provided at the front side of the tip end of the air feed nozzle 6, which is provided in opposition to the air feed nozzle 4. This coating chamber 13 is made a little wider than the injector sections 11, 12. It forms a space for use in hitting against each other therein a powdered material and a coating material 20 which are supplied with the high-pressure air in an accelerated state from the air feed nozzles 4, 6 and coating material feed nozzle 7 in the directions of arrows A, B, i.e. in the opposite directions, to pulverize the larger particles of the powdered material by the impact force generated when the particles of the material and coating material 20 collide with each other, and simultaneously cover the surfaces of the particles of the pulverized powdered material with the coating material.

The coating chamber 13 is communicated with a substantially circular classification chamber 15 via an inlet passage 14 provided at an upper portion of the former. In the classification chamber 15, the particles of the fine powder, which are coated in the coating chamber 13 to be then sent thereinto via the inlet passage 14, are turned therein to be classified centrifugally into larger particles and fine particles. The classification chamber 15 is provided in the substantially central portion thereof with an exit port 16 for recovering the fine particles. The coated fine particles are discharged from the exit port 16 into the cyclone 8 to be recovered. The classification chamber 15 is further provided at its right lower portion (FIG. 2) with a return passage 17, which extend diagonally, and which is used to return the larger particles collected in the inner portion of the chamber 15 due to the large centrifugal force to the position in front of the tip of the air feed nozzle 6 to pulverize them again in the coating chamber 13 and deposit the coating material on the re-pulverized particles.

The operation of this embodiment will now be described.

A powdered material, a material to be coated, is fed with a jet stream of the high-pressure air, which is ejected through the air feed nozzle 4, from the hopper 5 into the coating chamber 13 in the coating mechanism 3 in the direction of an arrow A (FIG. 3) as the powdered material is accelerated by the highvelocity air.

In the meantime, the coating material 20 to be deposited on the particles of the powdered material to be coated is fed from the tank 19 by means of the pump 18 with a jet stream of high-velocity air, which is ejected through the air feed nozzle 6 disposed in alignment with and in opposition to the air feed nozzle 4, to be fed in an accelerated state into the coating chamber 13 in the coating mechanism 3 in the direction of an arrow B (FIG. 3) via the coating material feed nozzle 7 and injector section 12.

Accordingly, in the interior of the coating chamber 13, the powedered material to be coated and the coating material which are fed in the opposite directions of the arrows A, B collide with each other, so that the larger particles of the material are broken into finer particles by the impact force generated when the collision occurs, and the surfaces of the particles of the pulverized powdered material are simultaneously covered with the coating material during this time.

The fine powder which are thus pulverized and coated, and the coating material are then sent upward from the coating chamber 13 into the classification chamber 15 in the tangential direction thereof via the inlet passage 14. The fine powder and coating material entering the classification chamber 15 flow circularly along the surface of inner wall thereof to carry out the deposition of the coating material on the particles of the fine powder completely and classify the particles by the centrifugal force generated while they are moved circularly in the classification chamber 15. Namely, larger particles are collected in the vicinity of the surface of the inner wall of the classification chamber 15 to be returned therefrom to a position in front of the tip of the air feed nozzle 6 via the return passage 17. The returned particles collide in the coating chamber 13 with the powdered material fed through the air feed nozzle 4, to be pulverized and coated again.

In the meantime, the fully pulverized portion of the powdered material is collected in the central section of the classification chamber 15 and discharged from the discharge port 16 into the cyclone 8 through a pipe (not shown) to be thereby recovered.

According to this embodiment, a powdered material can thus be pulverized, and the particles of extremely small sizes thereof can be coated easily, efficiently and uniformly. Since the particles of comparatively large sizes to be fed are came into collision with the large particles returned centrifugally from the classification chamber 15, to be pulverized in the coating chamber 13, the particle size of the product can be made uniform.

Figure 4:
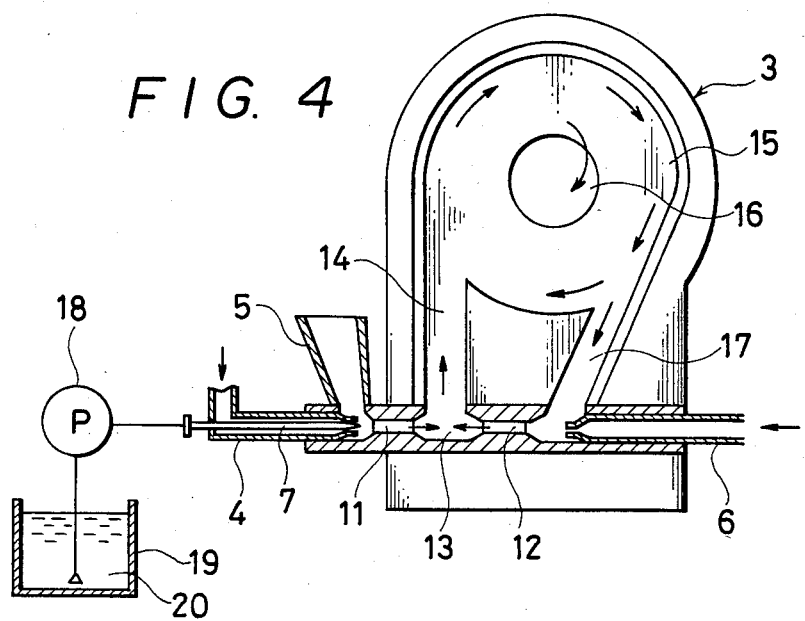
FIG. 4 is a partially sectioned front elevation of a coating mechanism according to a second embodiment of the present invention.

FIG. 4 is a partially sectioned front eleveation of a coating mechanism in a second embodiment of the present invention.

In this embodiment, a nozzle 7 for supplying a coating material 20 in a tank 19 is inserted coaxially in a coating material feed nozzle 4.

Namely, in the second embodiment, a powdered material, i.e. a material to be coated, and a coating material 20 are fed in the same direction to collide in a coating chamber 13 with the coarse particles returned from the chamber 15 by means of acceleration of a jet stream ejected through a nozzle 6, so that the powdered material is pulverized by the impact energy generated due to the collision mentioned above. Consequently, the surfaces of the particles of the pulverized fine material are coated uniformly with a solution of the coating material 20.

Figure 5:
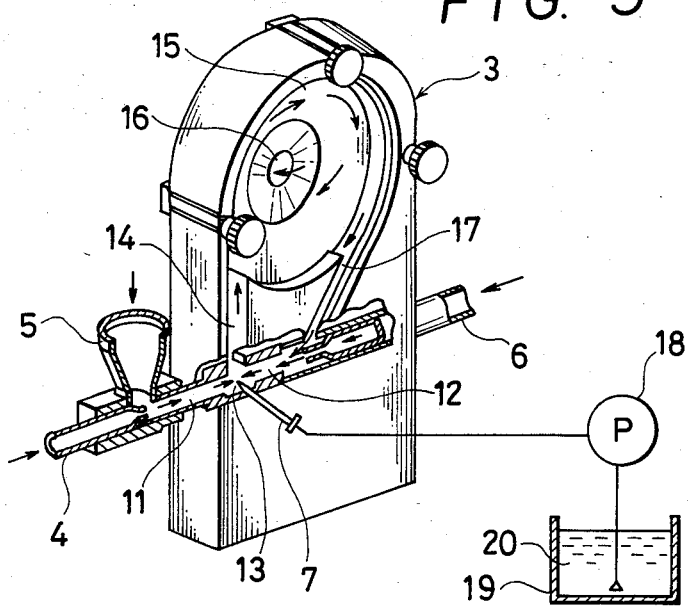
FIG. 5 is a partially sectioned perspective view of a coating mechanism according to a third embodiment of the present invention.

FIG. 5 is a partially sectioned perspective view of a coating mechanism in a third embodiment of the present invention.

In the third embodiment, coating material feed nozzle 7 is disposed at the front side of a coating mechanism 3 into a pulverization chamber 13 in the direction which is substantially at right angles to the direction of a jet stream of the high-pressure air from the nozzle 6 and the direction in which a powdered material is ejected.

Therefore, in the third embodiment, a coating material 20 in a tank 19 is supplied from a front end of the feed nozzle 7 directly into the pulverization chamber 13 by a pump 18. Accordingly, the particles of the fine powder which collide with particles accelerated by a jet stream of the high-pressure air ejected from a nozzle 6 in the opposite direction and pulverized, and the surfaces of the resultant particles are coated efficiently. The coated particles of the fine powder are then carried into a classification chamber 15. The classifying of the coated particles in the chamber 15 is done in substantially the same manner as in the first and second embodiments.

Figure 6:
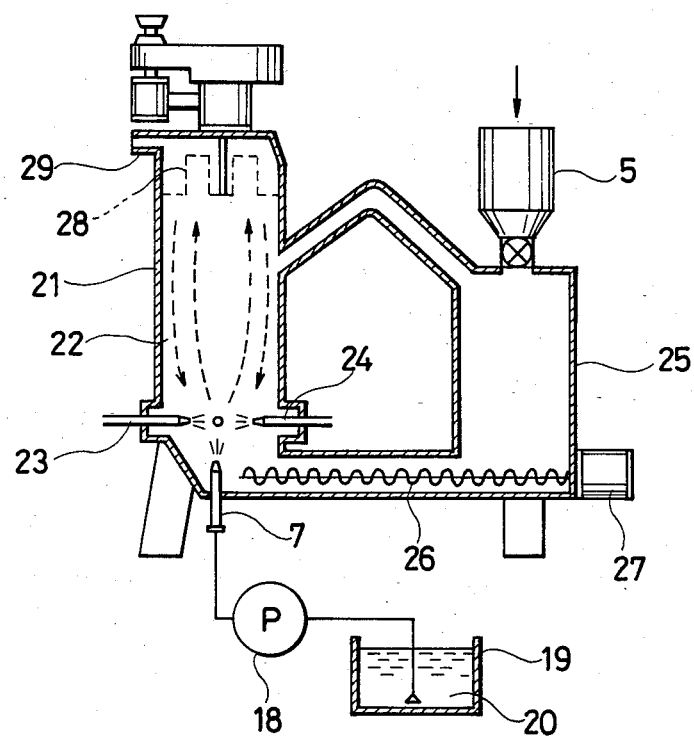
FIG. 6 is a sectional view of a coating mechanism in accordance with a fourth embodiment of the present invention.

FIG. 6 is a sectional view of a coating mechanism in a fourth embodiment of the present invention.

The coating apparatus in the fourth embodiment consists of the construction which is generally called "a counter-flow type fluidized bed jet mill".

This coating apparatus has a fluidized bed type pulverization chamber 22 in a pulverizer body 21, and a plurality of air feed nozzles 23, 24 for supplying the pulverizing high-pressure air are inserted in an opposed relationship into the portions of the pulverization chamber 22 which are in the vicinity of a bottom section thereof.

The material to be coated which is stored in a hopper 5 is fed into a storage tank 25, and then into the pulverization chamber 22 by driving a screw 26 by a motor 27.

A coating material feed nozzle 7 is inserted in a substantially upwardly-directed state into the bottom portion of the pulverization chamber 22 which is in front of a free end of the screw 26.

The pulverization chamber 22 is further provided at its upper portion with a mechanical centrifugal classifier 28 and a discharge port 29 from which a classified coated product is recovered. The discharge port 29 is communicated with a collector consisting of a bag filter (not shown) or a cyclone (not shown).

Therefore, in the fourth embodiment, a powdered material, i.e. a material to be coated, which is fed into the pulverization chamber 22 by the screw 26, is crushed into super-fine particles by the jet stream from the opposed air feed nozzles 23, 24, and these particles are coated uniformly at the same time with a solution of a coating material 20 which is sent out under pressure from a tank 19 by a pump 18 and ejected from the nozzle 7. The satisfactorily super-fine, pulverization-coated product is recovered and collected from the discharge port 29 via the classifier 28.

The present invention is not limited to the above embodiments 1–4; various modifications thereof can be made.

For example, various coating apparatuses other than the above-described embodiments can be made, in which the position and direction in which the powdered material, a material to be coated, and the coating material to be fed is changed variously with a jet stream of the high-pressure air and the powdered material ejected in the opposite directions so as to come into collision with each other as in the mentioned embodiments.

The number and the position of installation of the coating material feed means are not limited, either, to those in the above embodiments.

The present invention can be utilized widely for modifying the surfaces of fine particles of a powdered material, such as chemicals and food and coating these particles with a pigment and wax; and also for coating the copying toner and an active carbon with a resin and coating a wetting material, cosmetics, health food, seasoning, ceramic materials, magnetic powder, beverage powder, powdered dairy products and plastics with various coating materials.

A coating material in the form of a suspension or a pulverulent can be used in addition to a coating material in the form of a liquid. When a pulverulent, for example, wax, a hardened oil, lard, head, paraffin, solid polyethylene glycol, a solid surfactant, or a powdered resin is used as a coating material, the hot air for melting the wax and other materials can be introduced into a coating mechanism, or a heating means can be provided therein.

EXPERIMENT 1

The same coating apparatus as shown in FIGS. 1 and 2 was used to pulverize 100 g of phenytoin under the pulverization conditions including the air pressure of 7.5 kg/cm$^2$G, an air flow rate of 1 Nm$^3$/min and a feed rate of phenytoin of 1 kg/hr while atomizing 100 g of a methylene chloride solution of 5% hydroxypropyl cellulose (HPC-SL) at a liquid flow rate of 1 kg/hr from a nozzle 7 to obtain a coated product of pulverized phenytoin. The phenytoin content of the product thus obtained was 95%.

Figure 7:
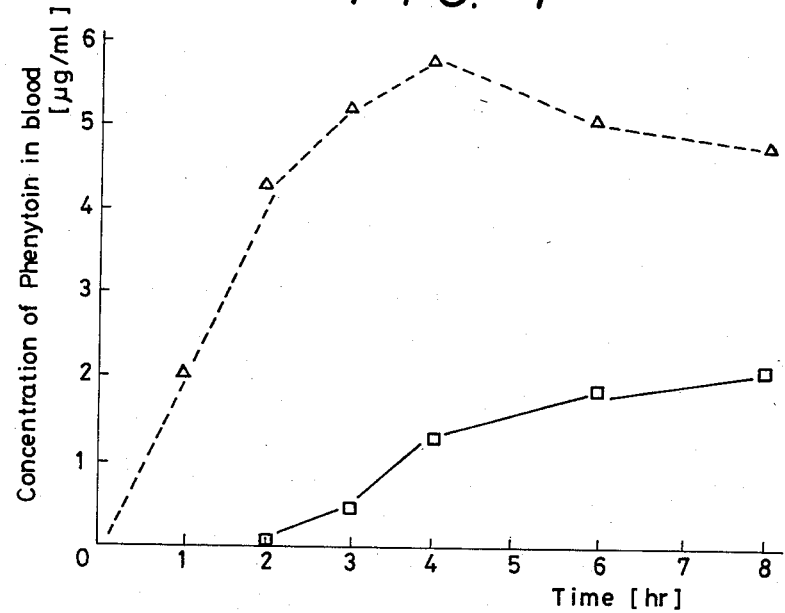
FIGS. 7 and 8 are graphs showing the results of various experiments conducted according to the present invention.

In order to evaluate the pulverization-coated phenytoin obtained in Experiment 1, 100 mg of the phenytoin product was administered orally after a meal to each of six healthy men to determine the concentration of phenytoin in the blood with the lapse of time. It was ascertained that, as shown in FIG. 7, the concentration of coated phenytoin (shown by a broken line) in the blood is higher than that of non-coated phenytoin (shown by a full line). Thus, the results of the above experiments proved that the effectiveness of the coated phenytoin is very great.

EXPERIMENT 2

The same coating apparatus as shown in FIGS. 1 and 2 was used to pulverize 300 g of ascorbic acid stearate under the pulverization conditions including the air pressure of 7.5 kg/cm$^2$G, an air flow rate of 1.0 Nm$^3$/min and a feed rate of ascorbic acid stearate of 600 g/hr while atomizing 450 g of a solution of fluorodichloromethane of 2% polyoxyethylene (12 mols) alkylether(sold in a commercial name of BT-12 and manufactured by Nikko Chemicals Co., Ltd.) at a liquid flow rate of 900 g/hr from a nozzle 7 to obtain a coated product of pulverized ascorbic acid stearate. The ascorbic acid stearate content of the product thus obtained was 97%.

Figure 8:
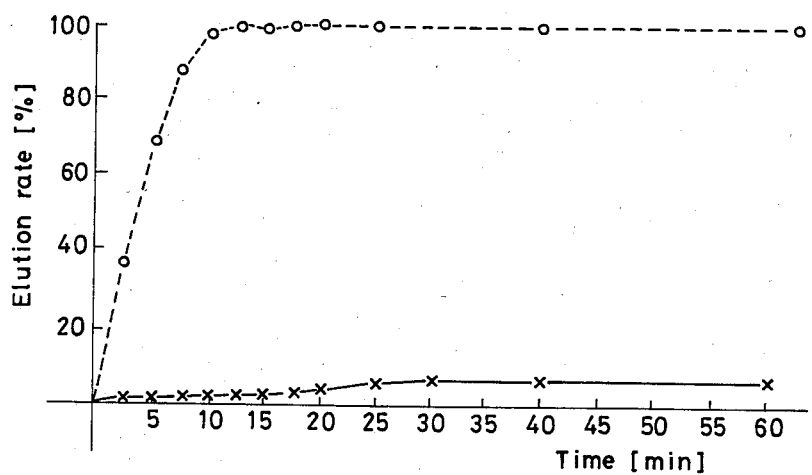

In order to evaluate the pulverization-coated ascorbic acid stearate thus obtained, the dispersability thereof with respect to the water was determined. 200 mg of the pulverization-coated ascorbic acid stearate and 200 mg of stock powder of ascorbic acid stearate, which was used as a comparative example, were packed in hard capsules and subjected to an elution test by using an elution tester (Model DT-300 manufactured by Freund Industrial Co., Ltd.) according to the 10th Revision of Japanese Pharmacopoeia. The results are shown in FIG. 8.

The results show that the dispersability in the water of the coated ascorbic acid stearate (shown by a broken line), which was obtained in this Experiment, is far superior to that of the non-coated ascorbic acid stearate (shown by a full line).

EXPERIMENT 3

The same coating apparatus as shown in FIG. 4 was used to pulverize 50 g of phthalocyanine blue under the pulverization conditions including the air pressure of 7.0 kg/cm$^2$G, an air flow rate of 0.8 Nm$^3$/min and a feed rate of phthalocyanine blue of 380 g/hr while atomizing 25 g of a carbon tetrachloride solution of 1% di-2-ethylhexylsulfosodium succinate (sold in a commercial name of OTP-100S and manufactured by Nikko Chemicals Co., Ltd.) at a liquid flow rate of 190 g/hr from a nozzle 7 to obtain a pulverization-coated product having a phthalocyanine blue content of 99.5%.

In order to evaluate the pulverization-coated phthalocyanine blue obtained in Experiment 3, it was dispersed in the water paint. Not less than two hours were required to perfectly disperse the uncoated phthalocyanine blue in the water paint by using a propeller agitator having a diameter of 15 cm and operated at 200 r.p.m., but only not more than ten minutes the coated phthalocyanine blue obtained in Experiment 3.

EXPERIMENT 4

The same coating apparatus as shown in FIG. 6 was used to pulverize zinc pyrithion under the pulverization conditions including the air pressure of 8 kg/cm$^2$G, an air flow rate of 0.8 Nm$^3$/min and a feed rate of a zinc pyrithion of 1 kg/hr while atomizing a methylene chloride solution of 5% OTP-100S at a liquid flow rate of 0.2 kg/hr to obtain a pulverization-coated product having a 99% zinc pyrithion content.

This pulverization-coated product of zinc pyrithion was dispersed in the water in about a few minutes, and the uniformly-dispersed state thereof was maintained for about 35 minutes.

In order to make a comparative experiment, the uncoated powder of zinc pyrithion having the same particle diameter as the above-mentioned coated product by pulverization only was dispersed in the water. As a result, the powder floated in the state of agglomeration on the surface of the water; it was not dispersed uniformly in the water.

As described above, the present invention has the following various excellent effects.

(1) In the interior of the coating chamber, the powder to be coated and the coating material which are fed in the opposite directions are came to collide with each other, so as to be hit thereon and pulverized in a pulverization chamber. Consequently, the new surfaces, which occur due to the pulverization, and which have a high degree of activity, of the particles of the material to be coated are coated at substantially the same time that the pulverization is done. Therefore, the surface of particles to be coated have the nature of high anti oxidation and hygroscopic depression, so that the deterioration of these surfaces can be prevented.

(2) Since a jet air stream and high velocity flow are used for pulverization-coating the particles of a powdered material, a finely-pulverized, uniformly-coated product having a narrow range of particle size distribution can be obtained.

(3) The jet air stream in use expands adiabatically to produce the Joule-Tomson effect, so that a powdered material having a low melting point can be pulverization-coated excellently.

(4) Since the pulverization-coating of a powdered material is done by utilizing the impact energy generated by mutual collision of particles which are accelerated by fluid, such as a gas and super heated vapor, no extraneous matter is mixed in a coated product, and a non-contaminated coated product can be obtained.

(5) A coating material consisting of a liquid or a liquefied material, such a solution, a suspension or a material obtained by melting a solid material is used, so that the occurrence of the static electricity during the pulverization of an object powdered material can be prevented. This enables the danger of occurrence of dust explosion to be eliminated. Also, a phenomenon in which particles in the state of agglomeration are coated with one spherical layer of a coating material can be avoided.

While some preferred embodiments of the present invention are described herein in detail, it is to be understood that the present invention is not limited thereby, and that many other modifications can be made within the spirit and scope of the attached claims.

What is claimed is:

1. A coating apparatus comprising a pulverization zone provided in a pulverizer, first and second air feed nozzles for sending out jet streams of a high-pressure fluid into said pulverization zones in the directions in which these jet streams collide frontally with each other, a means for feeding a raw material to be pulverized into said pulverization zone with a jet stream from at least one of said air feed nozzles, and a means for feeding a coating material into said pulverization zone consisting of a coating feed nozzle extending coaxially in at least one of said air feed nozzles.

2. A coating apparatus according to claim 1, wherein said means for feeding a raw material to be pulverized consists of a hopper adapted to supply said raw material into a jet stream from at least one of said air feed nozzles.

3. A coating apparatus according to claim 1, wherein said means for feeding a raw material to be pulverized consists of a screw adapted to said raw material mechanically into said pulverization zone.

4. A coating apparatus according to claim 1, wherein said coating feed nozzle is provided coaxially in the air feed nozzle which is opposed to said means for feeding a raw material to be pulverized.

5. A coating apparatus according to claim 1, wherein said pulverizer consists of a classifying mechanism composed of an inlet passage communicated with said pulverization zone, a classification chamber in which said pulverized and coated material fed thereinto via said inlet passage is classified centrifugally into fine particles and larger particles, a recovery port from which said fine particles are recovered, and a return passage for sending said larger particles back to said pulverization zone.

6. A coating apparatus according to claim 1, wherein said pulverizer consists of a counter-flow type fluidized bed jet mill having a fluidized bed type pulverization zone in a pulverizer body, said air nozzles being disposed in an opposed state in said pulverization zone.

* * * * *